POSITION ERROR ASSIMILATOR

Filed Oct. 1, 1954 3 Sheets-Sheet 1

INVENTOR.
James R. Hall
BY Olin J. Mitchell
ATTORNEY

INVENTOR.
James R. Hall
BY Olin J. Mitchell
ATTORNEY

Feb. 11, 1958 J. R. HALL 2,823,255

POSITION ERROR ASSIMILATOR

Filed Oct. 1, 1954 3 Sheets-Sheet 3

INVENTOR.
James R. Hall
BY
Chin D. Mitchell
ATTORNEY

Patented Feb. 11, 1958

2,823,255

POSITION ERROR ASSIMILATOR

James Robert Hall, Haddonfield, N. J., assignor to Radio Corporation of America, a corporation of Delaware Application October 1, 1954, Serial No. 459,675

12 Claims. (Cl. 178—6.6)

This invention relates to a system for recording and reproducing relatively wide band frequency signals by means of magnetic tape, and in particular to apparatus for overcoming the effect of irregular tape transport velocity on the fidelity of reproduction of the recorded signals.

There are many applications for the use of recording signals on magnetic tape. Television, electronic computing machines, telemetering apparatus, laboratory analytic apparatus and high speed data or information storing systems are some fields in which magnetic tape recording finds utility.

It is essential in many of these fields to reproduce the stored information with as great a degree of frequency and phase fidelity as possible. For example, magnetic recording has recently been demonstrated for use in recording with monochrome or color television signals.

Especially in color television recording is there a need for insuring the fidelity of reproduction of stored information. A high degree of accuracy is required to permit the reproduced signals to be broadcast in conformity with the color television standards approved for United States broadcast by the Federal Communications Commission. These standards are quite rigorous, and permit of only relatively small deviations and tolerances.

In accordance with the present invention, information which has been recorded on a moveable magnetic medium is sampled in response to a reference signal which has also been recorded on said medium so that relatively wide pulses whose amplitude represents the amplitude of the reproduced signal at given periods of time are produced. Long term or relatively large velocity changes of the playback transport system are corrected by a conventional servo or other well-known electrical or mechanical system. These wide pulses are then sampled by sharp narrow pulses whose frequency is fixed and is such that there will be one narrow pulse for each wide pulse. So long as each narrow pulse occurs during a time interval in which a corresponding wide pulse occurs, a true sample of the amplitude of the corresponding wide pulse may be obtained regardless of the particular instant in time in which the narrow pulse and the wide pulse coincide. Therefore, the narrow pulses may be used to regenerate the signals as they were before being subject to the velocity variations of the tape transport apparatus.

One object of the present invention is to provide apparatus for overcoming the effects of relatively short term velocity variations in recording and reproducing information signals by means of a moveable magnetic medium.

Another object of the present invention is to provide a system whereby relatively wideband information signals may be recorded and reproduced with good fidelity from magnetic tape.

Still another object of the invention is to provide a system whereby the effects of variations in tape velocity during the recording and reproduction of monochrome and color television signals may be overcome.

Other objects of the invention as well as an understanding of its operation may be ascertained by referring to the following explanation and to the accompanying drawings in which.

Figure 1:
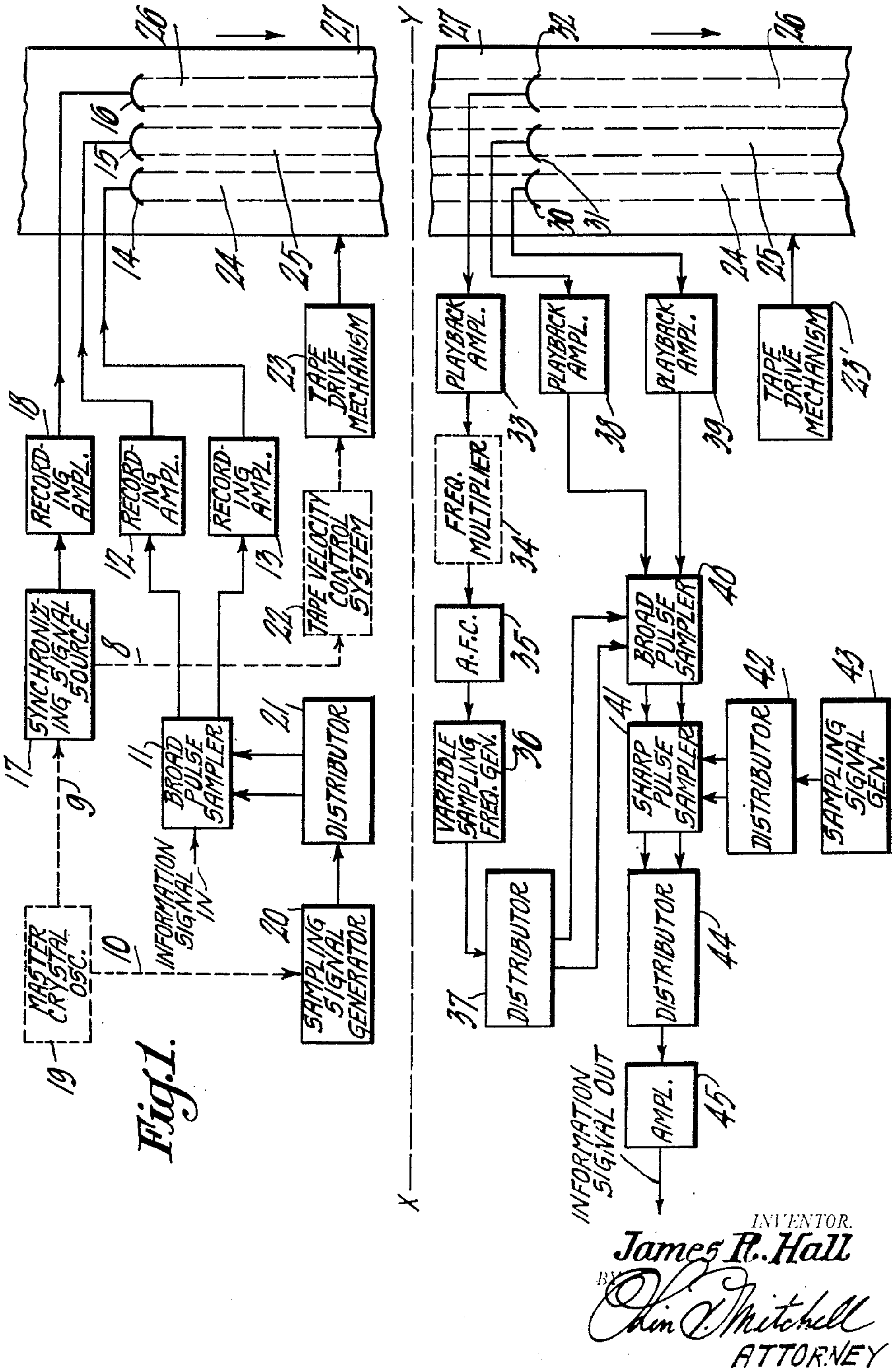
Figure 1 is a block diagram of one form of the invention as applied to a multiplex system of tape recording.
Figure 2:
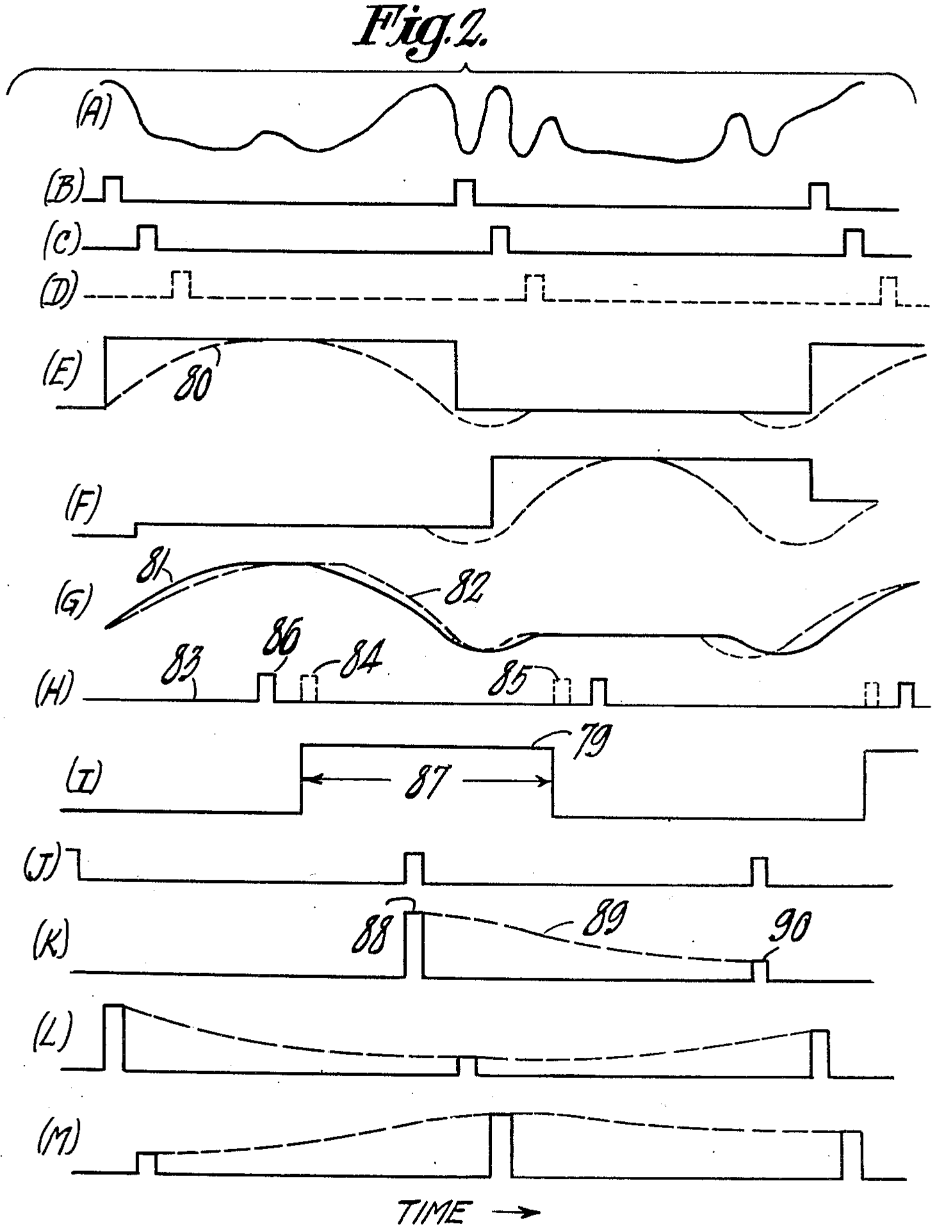
Figure 2 is a group of curves to which reference is made throughout the specification.

Figure 1 shows an overall recording and reproducing system in which relatively wideband frequency signals are recorded using multiplex. An information signal having a relatively wideband of frequencies, such as a conventional composite video signal extending from 0–4 mc., is applied to a broad pulse sampler 11. Sampling signals, which may be pulses for example, are also supplied from sampling signal generator 20 via distributor 21 to the broad pulse sampler 11. It is the function of sampler 11, in response to the sampling pulses supplied from generator 20, to develop broad pulses whose height is approximately equal to that of a given time portion of the input information signal. For simplicity, it will be assumed that although the input information signal may be multiplexed into 8 or 10 different channels, for example, only two such channels will be considered in the explanation to follow. As will hereinafter become apparent, if the broad pulse sampler 11 is based upon the sampler circuit structure of Figure 4, it will, in effect, contain two sections, each section being a separate broad pulse sampling circuit respectively actuated by pulses of different timing from the distributor 21. Thus, distributor 21 is pictured as having two couplings to the sampler 11 while broad pulse sampler 11 (i. e., each section thereof) is shown having separate connections to recording amplifiers 12 and 13 respectively. In curve A of Figure 2 a representation of a typical video input signal is shown. In curves B and C respectively of Figure 2 sampling pulses from distributor 21 are shown. Curve D merely indicates the relation that other sampling pulses from distributor 21 bear with respect to curves B and C.

As a result of the operation of broad pulse sampler 11 in response to the sampling pulses (curves B and C) from distributor 21 two sets of broad pulses appear in the output of sampler 11 as shown in curves E and F. These two sets are applied to recording amplifiers 12 and 13 which may take various forms depending upon the frequency components to be recorded on the tape 27. They may also possess some equalizing or other compensating networks to take into account the frequency discrimination characteristics of the overall system. The form of these recording amplifiers is not critical to the operation of the present invention, and they may be any of a number of amplifiers which are well known in the recording art. The recording amplifiers 12 and 13 are coupled respectively to transducers 15 and 14 which are pressed substantially in contact with tape 27 so that they convert the electrical variations into corresponding magnetic flux patterns in tracks 24 and 25 respectively. The transducers 14 and 15 may also be conventional and their characteristics should, of course, match those of the rest of the recording system insofar as possible.

Figure 3:
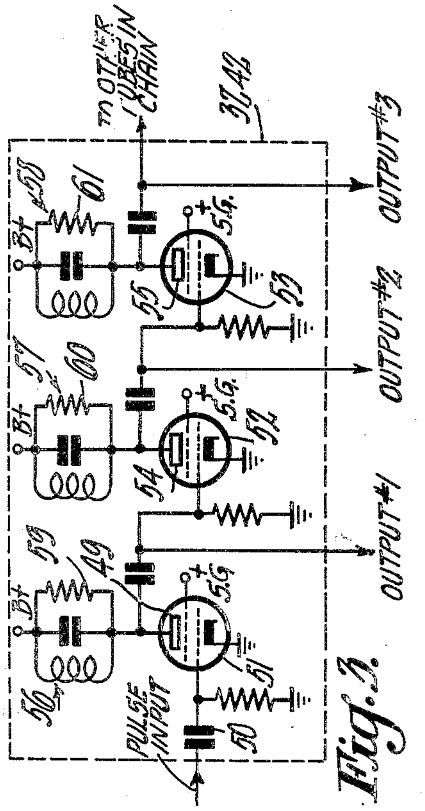
Figure 3 is a circuit diagram showing the contents of one of the components depicted schematically in Figure 1.

It may be well to examine in more detail the operation of the distributor 21 and the broad pulse sampler 11 at this point. Figure 3 shows one form of distributor which can apply the sampling pulses such as shown in curves B and C in the proper time relation to the sampler 11. Pulses supplied from sampling signal generator 20 are coupled via condenser 50 to the control grid of tube 51. The tubes 51, 52, and 53 are essentially the same and perform similarly. There will be as many tubes as there are channels in which the input information signal is multiplexed. Tubes 51 and 52 for example, may supply the wave forms shown in curves B and C of Figure 2 whereas tube 53 and subsequent tubes in the chain may supply curve D and similar sampling waveforms which are not shown. The polarity of the pulses applied to the grid of tube 51 is positive which causes a negative wave to appear at the plate 49. A number of ringing circuits 56, 57, and 58 are coupled to the plates 49, 54, and 55 respectively. These ringing circuits have a Q of substantially unity so that they ring for approximately only one cycle of sine wave oscillation. The values of resistors 59, 60, and 61 are so chosen as to abet the damping action of the ringing circuit.

The positive half cycle produced by the ringing circuit in the plate 49 is applied to the grid of the second tube 52 and causes a negative voltage wave followed by a positive half cycle to appear at plate 54. It will be noted that the positive half cycle appears half a cycle later than the positive half cycle appearing at the plate 49 of tube 51. It is apparent that following the application of a positive pulse to the control grid of tube 53, positive half cycles successively appear on the plates of the successive tubes in the chains, the positive half cycles in each tube being delayed a half cycle at the frequency to which the ringing circuits are resonant.

After positive half cycles have been generated on the plates of all of the tubes in the chain, a second pulse from generator 20 is applied to the grid of tube 51 whereupon the cycle of operation is then repeated. The apparatus shown in Figure 3 is the subject matter of my copending U. S. application Serial No. 418,164, filed March 23, 1954, and entitled "Pulse Distributor." Actually, in the two channel multiplex arrangement of Figures 1 and 2, only tubes 51 and 52 would be required in the distributor circuit of Figure 3.

Figure 4:
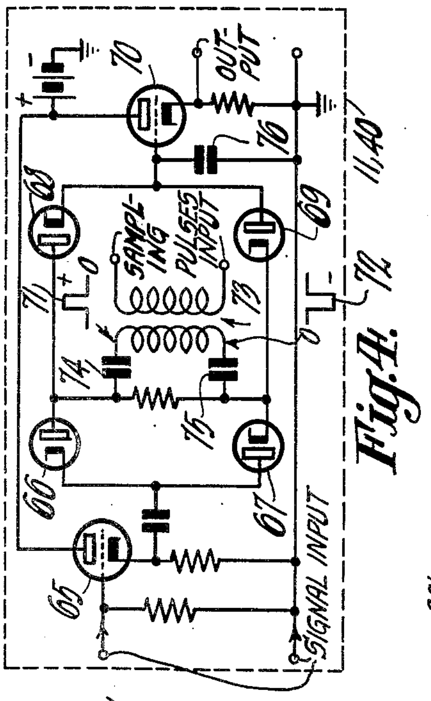
Figure 4 is a circuit diagram of another of the components shown in Figure 1.

Figure 4 shows apparatus which may be used to develop broad pulses having amplitudes which correspond to the amplitude of the information signals taken during mutually exclusive time intervals. The information signal is applied to the control grid of a tube 65 whose anode is connected to a source of positive D. C. potential. Pulses supplied from distributor 21 (at either output No. 1, No. 2 or No. 3 in Figure 3) are used to develop simultaneous positive and negative pulses 71 and 72 by means of transformer 73. To couple the pulses from the distributor of Figure 3 to the sampler of Figure 4, one terminal of the transformer 73 (Figure 4) may be grounded and the other terminal thereof connected to the particular desired output terminal of the distributor in Figure 3. The pulses 71 and 72 are coupled via capacitors 74 and 75 to the anode of diode 66 and the cathode of diode 67. The transformer 73 should be capable of passing the sampling signals or pulses without distorting them. The positive pulse 71 is also applied to the anode of diode 68 and the negative pulse 72 is also applied to the cathode of diode 69. The positive pulse 71 renders diodes 66 and 68 conductive and the negative pulse 72 renders the diodes 67 and 69 conductive so that a voltage proportional to the signal voltage is applied to capacitor 76. At the end of the positive pulse 71 the diodes 66 and 68 are held cut off by the negative charge on the terminal of the capacitor 74. Likewise, at the end of the pulse 72 the diodes 67 and 69 are held cut off by the positive charge on the terminal of capacitor 75 which is coupled to the cathode of diodes 67 and 69. During the time that the diodes are conductive, the capacitor 76 is charged to value equal to or representative of the value of the information signal at that particular time. Since the resistance of the discharge path of the capacitor 76 through the back resistance of the diodes and through the tube 70 is very high, the capacitor 76 will hold this charge until it is charged to a new value by the application of additional sampling pulses. It follows, of course, that should the capacitor be made extremely small, the back resistance of the diodes, although high, could act to discharge capacitor 76 very quickly. The result would be a sharp pulse sampling action of the type hereinafter employed in the arrangements of Figures 2 and 5. If the input information signal to be sampled is at a more positive value than its previous value, the diodes 67 and 68 begin to conduct slightly sooner than the diodes 66 and 69. During the time that the diodes 67 and 68 only are conducting, the capacitor 76 is charged to the new value of the input information signal at that time. When the diodes 66 and 69 do begin to conduct, current then flows through the diodes 68 and 69 and through the diodes 66 and 67 without affecting the charge on the capacitor 76. The circuit of Figure 4 is treated in my copending application, Serial No. 434,937, filed June 7, 1954, and entitled "Sampler Circuit." As brought out above, it will be understood that in the operation of the present invention, a separate sampler circuit of the type shown in Figure 4 will be required for each multiplex channel.

It is also desirable to record reference or synchronizing signals on the tape 27. For this reason synchronizing signal source 17 supplies sync signals to a recording driving amplifier 18 which may be similar to recording amplifiers 12 and 13 depending upon the frequency of the synchronizing signals to be recorded. The recording amplifier 18 energizes transducer 16, which also may be similar to transducers 14 and 15 so that the synchronizing signals are recorded on track 26 of tape 27. To insure a locked-in relation between the time of sampling and the recorded sync signals, the source 17 and the generator 20 may both be coupled, as shown by the dashed lines 9 and 10, to a master crystal oscillator 19. It is understood that if the sync signals to be recorded have a frequency different from that of the sampling signals supplied by generator 20, appropriate frequency multiplication or division circuits (not shown) are employed to derive them.

For relatively long term drifts in tape velocity a system for maintaining velocity constant may be employed. A tape velocity control system 22 may be coupled to the synchronizing signal source 17 as shown by the dashed line 8 and to the tape drive mechanism 23. The tape drive mechanism 23 may consist of a capstan which presses the tape 27 against an idler wheel (not shown). The capstan may be coupled to a fly wheel arrangement and may also be coupled to a tone wheel which generates signals at approximately the frequency of the sync signals from source 17. The tone wheel signals and the sync signals may be compared in phase to derive an error voltage which is applied through a conventional servo system to control the speed of the motor which drives the fly wheel by means of a magnetic clutch, for example. No details of the tape velocity control system are pictured herein as they are not essential to the operation of the present invention. Suffice it to say that if there is no long term drift in tape velocity or if the tape velocity control system used cuts any such drift to a small degree the invention is equally applicable.

Below the dashed line X—Y is shown the way in which the invention is applied on the playback end of a multiplex type of tape recording and reproducing system.

The tape 27 with its three tracks 24, 25 and 26 is moved past transducers 30, 31 and 32 by the action of tape drive mechanism 23' which may be identical to that of tape drive mechanism 23' shown above the dashed line X—Y. Transducer 32 converts the recorded flux patterns corresponding to the synchronizing signals into electrical variations which are amplified by playback amplifier 33. If the frequency of the synchronizing signal is a submultiple of the frequency of the sampling pulses supplied by generator 20 it will be necessary to multiply the recovered sync signals in a frequency multiplier 34. The multiplier 34 is shown in dashed lines to signify that it is optional. The output of multiplier 34 is a wave which has a frequency substantially the same as the frequency of the sampling signal generator 20. This output wave is applied to an automatic frequency control circuit 35. The automatic frequency control 35 operates to control a variable sampling frequency generator 36 which oscillates approximately at the sampling frequency. If the tape 27 is subjected to an increase in velocity such that the frequency of the recorded sync signals is effectively increased, when reproduced the automatic frequency control 35 will increase the frequency of the variable sampling frequency generator to correspond. The converse is true if the tape 27 begins to decelerate. Whatever changes occur in the frequencies recorded in track 26 will similarly affect the frequencies of the signals recorded in tracks 24 and 25. The transducers 30 and 31 convert the recorded signals into corresponding electrical variations which are applied to playback amplifiers 38 and 39 respectively. All three playback amplifiers 33, 38 and 39 may be similar. The output circuits of playback amplifiers 38 and 39 are coupled to broad pulse sampler 40 which may be identical to sampler 11 shown above the dashed line X—Y. Sampling pulses are conveyed by distributor 37 from generator 36 to the appropriate stages in the sampler 40.

Although rectangular types of pulses have been produced by the broad pulse sampler 11 at the recording end since the components of the recording and reproducing system are tantamount to a low pass filter, the high frequency components which comprise the steep leading and trailing edges of the rectangular pulses are lost. The result is that the wave as recorded resembles the dashed line 80 of curve E of Figure 2. If the tape speed was constant both on the recording and reproducing end the output of the transducer 30, for example, might be as shown by the solid line 81 of curve G of Figure 2. Line 81 is the same as line 80 in curve E. However, as a result of irregular tape velocity the output of transducer 31 will in reality be more like that shown by the dashed line 82 in which it at first is delayed and then is advanced with respect to time.

The solid line 83 of curve H shows sampling pulses which may be produced by the variable sampling frequency generator 36 if there has been no acceleration or deceleration of the tape either at the recording or playback end of the system. Since the velocity of the tape has in fact changed as shown by the dashed line 82 of curve G the recorded sync signals will cause the variable sampling frequency generator 36, through the intermediary of automatic frequency control 35 to produce a delayed pulse 84 and an advanced pulse 85. Thus, a sample of the dashed line 82 of curve G taken during the time that delayed pulse 84 occurs will give the same amplitude as a sample of the solid line 81 taken at the time that pulse 86 occurs. The sampling pulses supplied by generator 36 via distributor 37 to broad pulse sampler 40 cause the circuits of broad pulse sampler 40 to form a stepped wave as shown in curve I. The steps of curve I have an amplitude commensurate with the amplitude of the dashed line 82. The broad pulse sampler 40 may consist of a number of units such as shown in Figure 4 depending upon the number of channels or tracks involved.

A sampling signal generator 43 provides sampling signals at the same frequency at which sampling signal generator 20 shown in Figure 1 operates. The generator 43 may be identical to the generator 20. The distributor 42 which may be essentially the same as distributor 21 (one form of which is shown in Figure 3) applies the sampling signals to a sharp pulse sampler 41 which receives the output waves from broad pulse sampler 40. The sharp pulse sampler 41 operates to sample the amplitude of the stepped waves shown in curve I. The structure of the sharp pulse sampler 41 may be of any conventional form such as that shown in an article entitled "A 32 channel high speed commutator," by Herman Alpert et al., appearing in Electronics, November 1950, page 4 et seq. Alternatively, the broad pulse sampler circuit of Figure 4 may be easily converted into a sharp pulse sampler by replacing the capacitor 76 (in Figure 4) with a resistor. In this way, the tube 70 will act as a simple cathode follower to deliver a pulse which resembles in waveform the pulses delivered by the distributor but of an amplitude which is a function of the instantaneous potential of the grid in tube 65 during the sampling interval. In response to one train of sampling signals appearing in the output of distributor 42, as shown by curve J, samples of the amplitude of the steps are taken at regularly recurrent intervals producing variable amplitude samples as shown in curve K. Even though the beginning of a step such as step 79 of curve I may vary, it will not affect the variable amplitude output wave as shown in K since the step 79 may occur any time during the time interval 87 without affecting the sample 88, for example, of curve K. Thus, jitter introduced by irregular tape velocity is of no consequence to the output waves of the shap pulse sampler 41 of which curve K is an example. However, the characteristics of the tape driving mechanism should be such as to have prevented long term drifts in velocity as, for example, by the use of a tape velocity control system 22 (Figure 1). The width of the broad pulses such as pulse 79 of curve I may be so adjusted as to account for the minor increases and decreases of a short term type that may still exist in the tape velocity.

A distributor 44, similar to distributor 42 (again of the form shown in Figure 3), acts to combine the output waves of the various sections of the sharp pulse sampler 41 into one wave which is amplified by amplifier 45 and applied to a particular utilization circuit. Since the playback system also has the effect of discriminating against high frequencies each of the waves combined in distributor 44 may resemble the one shown in line 89 of curve K.

The invention in one form has been explained in a system in which a broad pulse sampler 11 is used. However, broad pulse sampler 11 can be supplanted by a sharp pulse sampler followed by low pass filters. In such case the output of the low pass filters will be as shown in curves L and M in which it is seen that a smoothing out of the sharp pulses occurs. In all other respects the apparatus above the dashed line X—Y may be the same and the overall result is not altered to any appreciable degree.

The invention has also been explained in terms of recording synchonizing signals on track 26 which are a submultiple of the frequency of the sampling signal generator 20. Inasmuch as it is often desirable to sample the input information signal at a relatively rapid rate the generator 20 must produce a wave having a frequency which is relatively high. It may happen that the characteristics of the tape and the other recording apparatus are such that it would be feasible to impress the sampling frequency directly upon track 26 without reducing it. Hence frequency multiplier 34 on the playback end would be unnecessary as would the automatic frequency control system 35 and the variable sampling frequency generator 36. If the tape 27 should accelerate or decelerate, the input to distributor 37 would vary accordingly and hence irregularly spaced sampling pulses would be applied to broad pulse sampler 40 in a manner as shown in curve H of Figure 2. The irregularity in the spacing of the synchronizing signals as recovered from tape 27 would nonetheless permit samples of correspondingly accelerated or decelerated information signals in tracks 24 and 25 to be sampled at the proper points in time as shown by the relation of pulse 84 to line 82 instead of the relation of pulse 86 to line 81 in curves G and H.

Figure 5:
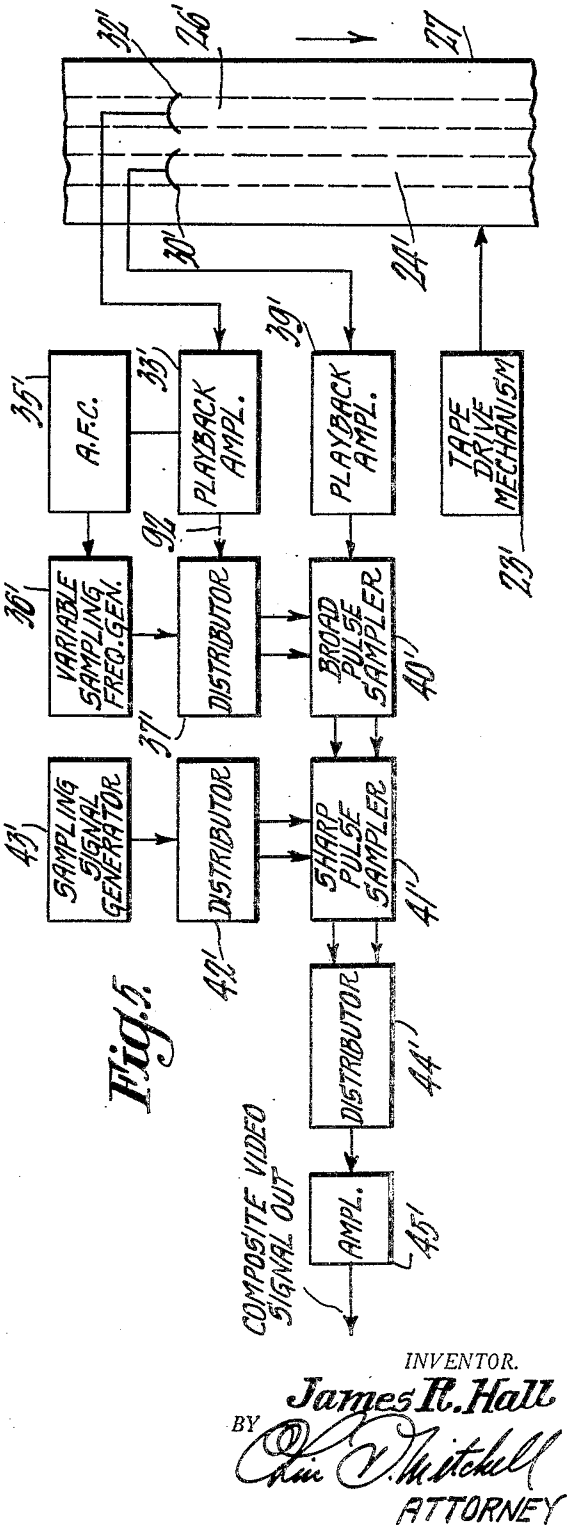
Figure 5 is a block diagram of another form of the invention as applied to a simplex type of television system.

Simple or single track systems for recording wideband frequency signals such as television signals also exist. In such systems, as shown in Figure 5, monochrome television signals may be recorded in the track 24′ of tape 27 whereas synchronizing signals may be recorded in track 26′. Transducers 30′ and 32′ convert the recorded flux patterns into corresponding electrical variations which are respectively amplified in playback amplifiers 39′ and 33′. The playback amplifier 33′ may be essentially the same as its counterpart, playback amplifier 33 shown in Figure 1. If the velocity of the tape 27 changes, the recovered and amplified sync signals are applied to automatic frequency control system 35′ which causes the variable sampling frequency generator 36′ to vary accordingly. It is to be understood, of course, that if the synchronizing information in track 26′ is recorded at a high enough frequency, the automatic frequency control 35′ and variable sampling frequency generator 36′ may be dispensed with, in which case the output of playback amplifier 33 would be coupled directly to distributor 37′ as shown by the dashed line 92. The distributor 37′ acts to provide a given number of sets of sampling pulses to broad pulse sampler 40′ which may be exactly the same as the broad pulse sampler 41.

If monochrome video signals have been recorded in track 24′ the transducer 30′ converts them into electrical variations which are amplified by playback amplifier 39′ and applied to broad pulse sampler 40′. In effect, the broad pulse sampler provides a number of stepped wave outputs resembling curves E and F depending upon the number of channels desired. The broad pulse sampler 40′, in other words, converts the simplex signals into multiplex signals.

A sampling signal generator 43′ which may operate to produce signals having the same frequency as those in track 26′ (if the connection of line 92 is made) produces sampling signals which are applied via distributor 42′ to sharp pulse sampler 41′. It is assumed that the tape drive mechanism 23′ is sufficiently effective so that long term velocity drifts are not possible or that, if it is not, that the tape drive mechanism is controlled by a velocity control system which is not shown. Therefore, the sampling signals (resembling those shown in curve J of Figure 2) which are used to sample the stepped waves applied to sharp pulse sampler 41 will always give a correct amplitude sample output as explained in connection with curves I and J of Figure 2.

I claim:

1. A system for reproducing information signals which have been recorded on at least one portion of a moveable magnetic medium, said medium also containing a reference signal which has been recorded thereupon, said system comprising in combination, means for recovering said recorded information and reference signals, means for producing relatively wide pulses having amplitudes corresponding to those of selected portions of said recovered information signals, said wide pulses being produced in response to said recovered reference signal, and means for sampling said wide pulses at a fixed rate.

2. A system for reproducing information signals which have been recorded on at least one portion of a moveable magnetic medium, said medium also containing a reference signal which has been recorded thereupon, comprising in combination, means for recovering said recorded information and reference signals, means for producing relatively wide pulses having amplitudes corresponding to those of selected portions of said recovered information signals, said wide pulses being produced in response to said recovered reference signal, means for sampling said wide pulses at a fixed rate, and means for combining said sampled wide pulses whereby said original information signals are obtained.

3. A system for recording and reproducing information signals by means of a moveable magnetic medium comprising in combination, means adapted to receive said information signals for producing relatively wide pulses having amplitudes corresponding to those of periodic portions of said information signals, means for recording said wide pulses on at least one portion of said medium, means for recording a reference signal on said medium, means for recovering said recorded wide pulses and said reference signal from said medium, and means for sampling said recovered wide pulses at a fixed rate.

4. A system for reproducing information signals which have been sampled to produce a plurality of sampled waves, said sampled waves having been recorded on a plurality of portions of a moveable magnetic medium, said medium also containing a reference signal which has been recorded thereupon, said system comprising in combination, a plurality of means for recovering each of said recorded sampled waves respectively, means for recovering said reference signal from said medium, means coupled to said plurality of recovering means for producing sets of relatively wide pulses which have amplitudes corresponding to those of selected portions of each of said recovered sampled waves, said wide pulse producing means also being coupled to said means for recovering said reference signals so that said wide pulses are produced in response to said recovered reference signal, and means for sampling each of said sets of wide pulses at a fixed rate whereby a plurality of output waves is produced.

5. The invention according to claim 4 with the addition of means for combining said plurality of output waves to obtain said original information signals.

6. A system for recording information signals on a movable medium, comprising in combination means for producing a plurality of sets of broad pulses corresponding to time-multiplexed portions of said information signals, a plurality of amplifying means adapted to receive a corresponding one of said sets of broad pulses, a plurality of transducing means each of which is substantially in contact with a corresponding distinct portion of said medium, each of said plurality of transducers being coupled to a corresponding one of said amplifying means whereupon each of said transducing means impresses a corresponding one of said amplified sets of broad pulses on one of said distinct portions, a source of a reference signal, means for amplifying said reference signal, and a transducer in contact with said medium adapted to impress said amplified reference signal on said medium.

7. A system for reproducing a plurality of sets of signals corresponding to time-multiplexed portions of information signals which have been recorded on a plurality of distinct portions of a magnetic medium, said medium also having a reference signal recorded thereupon, said system comprising, in combination, a plurality of transducers substantially in contact with said medium for recovering said recorded sets of signals, a transducer substantially in contact with said medium for recovering said recorded reference signal, a plurality of amplifying means coupled to said transducer for recovering said reference signal and to said plurality of transducers respectively, means coupled to said plurality of amplifying means for producing a plurality of sets of broad pulses having amplitudes respectively representative of selected portions of said recovered sets of signals, said broad pulse producing means operating in response to said recovered reference signal, means for sampling each of said sets of output pulses at a fixed rate to produce a plurality of sampled output waves, and means for combining said sampled output waves whereby said information signals are obtained.

8. A system for reproducing television signals which have been recorded on a single portion of a moveable magnetic medium, said medium also having synchronizing signals recorded thereupon, said system comprising, in combination, means for recovering said recorded television signals, means for recovering said synchronizing signals, a first sampling signal gneerator, means coupled to said first sampling signal generator and to said means for recovering said synchronizing signals for controlling the frequency of said first sampling signal generator in response to said recovered synchronizing signals, broad pulse sampling means coupled to said means for recovering said television signals, first means coupled to said first sampling signal generator and to said broad pulse sampling means for distributing the sampling signals produced by said first sampling signal generator to said broad pulse sampling means, said distributed sampling signals being adapted to control said broad pulse sampling means whereby said broad pulse sampling means produces a plurality of sets of broad pulse waves, a second sampling signal generator, sharp pulse sampling means coupled to receive said plurality of sets of broad pulse waves, second distributing means coupled to said second sampling signal generator and to said sharp pulse sampling means for applying said signals from said second sampling signal generator distributively to said sharp pulse sampling means, and combining means coupled to said sharp pulse sampling means.

9. A system for reproducing a plurality of sampled information signals recorded on a plurality of portions of a moveable magnetic medium, said medium also having synchronizing signals recorded thereupon, said system comprising in combination, a plurality of means for recovering each of said plurality of recorded sampled signals respectively, means for recovering said synchronizing signals from said medium, a variable sampling frequency generator, means coupled to said variable sampling frequency generator and to said means for recovering said synchronizing signals for controlling the frequency of said variable sampling frequency generator in response to said recovered synchronizing signals, means coupled to said plurality of recovering means for producing sets of relatively wide pulses which have amplitudes corresponding to the amplitudes of selected portions of each of said recovered sampled signals, means for applying signals produced by said variable sampling frequency generator to said means for producing said wide pulses, said means for producing said wide pulses being adapted to operate in response to said applied pulses, sharp pulse sampling means adapted to receive said sets of wide pulses, a sampling signal generator for producing sampling signals of fixed frequency, means for distributing said signals from said sampling signal generator to said sharp pulse sampling means whereby said wide pulses are sampled at said fixed frequency to produce a plurality of output waves, and means for combining said plurality of output waves.

10. A system for overcoming the effects of irregular velocity on a magnetic medium on which a plurality of time-multiplexed information waves have been recorded, said medium also containing a reference signal representative of the rate at which said information waves were multiplexed, said system comprising a plurality of transducers for recovering corresponding ones of said recorded multiplexed waves, a transducer for recovering said recorded reference signal, a variable sampling frequency generator for producing variable frequency sampling signals, means for applying said recovered reference signal so as to control the frequency of said variable sampling frequency generator, a broad pulse sampler adapted to receive said recovered multiplexed waves and said variable frequency sampling signals, said broad pulse sampler being adapted to produce broad pulses in response to the frequency of said variable frequency sampling signals, the amplitude of said broad pulses being related to portions of said recovered multiplexed waves, sharp pulse sampling means coupled to said broad pulse sampler for sampling said broad pulses at the rate at which said information waves were multiplexed whereby a plurality of amplitude modulated sharp pulse waves is produced, and means for combining said plurality of sharp pulse waves.

11. A system for overcoming the effects of irregular velocity upon a plurality of sampled waves derived by multiplexing input information signals at a given frequency and recording them on distinct portions of a moveable magnetic medium, said medium also containing recorded synchronizing signals on another distinct portion thereof, said system comprising a plurality of means for recovering said sampled waves and said synchronizing signals, a broad pulse sampler, means for applying each of said sampled waves to said broad pulse sampler, means for supplying sampling pulses to said broad pulse sampler, means coupled to said means for recovering said recorded synchronizing signals and to last-named supplying means for varying the frequency of said supplied sampling pulses in response to said recovered synchronizing signals, said broad pulse sampler thereupon being adapted to produce a plurality of broad pulse waves in response to said supplied sampling pulses corresponding to particular amplitude levels of said recovered sampled waves, means coupled to said broad pulse sampler for sampling each of said plurality of broad pulse waves at said given multiplexing frequency whereby a plurality of sharp pulse waves is produced, and means coupled to said last-named sampling means for combining said sharp pulse waves to reproduce said original information signal.

12. A recording and reproducing system comprising in combination a source of information signals, means for sampling said information signals at a given sampling frequency to provide a plurality of sampled waves, a moveable magnetic medium, means for impressing each of said sampled waves on a corresponding distinct portion of said medium, means for impressing synchronizing signals on said medium, a plurality of means for recovering said impressed sampled waves, means for recovering said synchronizing signals, means for sampling each of said recovered sampled waves in response to said recovered synchronizing signals, said last-named sampling means being adapted to produce broad pulses having an amplitude corresponding to the amplitude of corresponding portions of said recovered sampled waves, means for sampling said broad pulses at said given sampling frequency whereby a plurality of varying amplitude pulse waves having a constant frequency is produced, and means for combining said sharp pulse waves so as to reproduce said original information signal.

No references cited.